(12) United States Patent
Meier et al.

(10) Patent No.: US 6,481,251 B1
(45) Date of Patent: Nov. 19, 2002

(54) STORE QUEUE NUMBER ASSIGNMENT AND TRACKING

(75) Inventors: Stephan G. Meier, Sunnyvale, CA (US); Ramsey W. Haddad, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/433,184

(22) Filed: Oct. 25, 1999

(51) Int. Cl.$^7$ ................................................ G06F 3/00
(52) U.S. Cl. .......................... 70/52; 710/39; 710/112; 711/100; 711/141
(58) Field of Search ............................ 710/1, 9, 20, 52, 710/3, 36, 39, 40, 53–57, 112, 130; 711/106, 108, 159, 170, 100, 141

(56) References Cited

U.S. PATENT DOCUMENTS

| | | | |
|---|---|---|---|
| 5,377,336 A | | 12/1994 | Eickemeyer et al. |
| 5,450,564 A | * | 9/1995 | Hassler et al ............... 711/168 |
| 5,465,336 A | * | 11/1995 | Imai et al. .................. 711/213 |
| 5,471,598 A | | 11/1995 | Quattromani et al. |
| 5,606,670 A | | 2/1997 | Abramson et al. |
| 5,737,759 A | * | 4/1998 | Merchant .................... 711/146 |
| 5,745,729 A | | 4/1998 | Greenley et al. |
| 5,748,920 A | * | 5/1998 | Milld et al. .................. 710/128 |
| 5,802,588 A | | 9/1998 | Ramagopal et al. |
| 5,809,530 A | * | 9/1998 | Samara et al. ............... 711/140 |
| 5,832,297 A | | 11/1998 | Ramagopal et al. |
| 5,835,747 A | | 11/1998 | Trull |
| 5,884,067 A | * | 3/1999 | Storm et al. ................. 345/511 |
| 6,021,485 A | | 2/2000 | Feiste et al. |
| 6,141,747 A | | 10/2000 | Witt |
| 6,247,097 B1 | * | 6/2001 | Sinharoy ..................... 711/125 |
| 6,385,676 B1 | * | 5/2002 | Adkisson ..................... 710/10 |

FOREIGN PATENT DOCUMENTS

| | | |
|---|---|---|
| EP | 0 651 323 | 5/1995 |
| EP | 0 651 331 | 5/1995 |
| EP | 0 727 737 | 8/1996 |
| WO | 97/27538 | 7/1997 |

* cited by examiner

Primary Examiner—Jeffrey Gaffin
Assistant Examiner—Rijue Mai
(74) Attorney, Agent, or Firm—Lawrence J. Merkel

(57) ABSTRACT

A processor includes a store queue and a store queue number assignment circuit. The store queue number assignment circuit assigns store queue numbers to stores, and operates upon instruction operations prior to the instruction operations reaching a point in the pipeline of the processor at which out of order instruction processing begins. Thus, store queue entries may be reserved for stores according to the program order of the stores. Additionally, in one embodiment, the store queue number identifying the youngest store represented in the store queue may be assigned to loads. In this manner, loads may determine which stores in the store queue are older or younger than the load based on relative position within the store queue. Checking for store queue hits may be qualified with the entries between the head of the store queue and the entry indicated by the load's store queue number. In one particular embodiment, the store queue number may include an additional "toggle" bit which is toggled each time the assignment of store queue numbers reaches the maximum store queue entry and wraps to zero. If the toggle bit of the store in the store queue entry identified by the load's store queue number differs from the toggle bit of the load's store queue number, than the store queue entry has been reassigned to a store younger than the load.

24 Claims, 9 Drawing Sheets

STORE QUEUE NUMBER ASSIGNMENT AND TRACKING

BACKGROUND OF THE INVENTION

1. Field of the Invention

This invention is related to the field of processors and, more particularly, to the handling of store queue entry assignment in processors.

2. Description of the Related Art

Processors often include store queues to buffer store memory operations which have been executed but which are still speculative and/or have been retired but not yet committed to memory. The store memory operations may be held in the store queue until they are retired. Subsequent to retirement, the store memory operations may be committed to the cache and/or memory. As used herein, a memory operation is an operation specifying a transfer of data between a processor and a main memory (although the transfer may be completed in cache). Load memory operations specify a transfer of data from memory to the processor, and store memory operations specify a transfer of data from the processor to memory. Memory operations may be an implicit part of an instruction which includes a memory operation, or may be explicit load/store instructions. Load memory operations may be more succinctly referred to herein as "loads". Similarly, store memory operations may be more succinctly referred to as "stores".

While executing stores speculatively and queueing them in the store queue may allow for increased performance (by removing the stores from the instruction execution pipeline and allowing other, subsequent instructions to execute), subsequent loads may access the memory locations updated by the stores in the store queue. While processor performance is not necessarily directly affected by having stores queued in the store queue, performance may be affected if subsequent loads are delayed due to accessing memory locations updated by stores in the store queue. Furthermore, if a processor allows memory operations to be executed out of order, it is difficult to determine which of the stores in the store queue are older than a load (and hence the load may read bytes updated by the store) and which of the stores are younger than the load (and hence the load should not read the bytes updated by the store since it is prior to the store in program order). As used herein, a store queue entry storing a store memory operation is referred to as being "hit" by a load memory operation if at least one byte updated by the store memory operation is accessed by the load memory operation.

Additionally, processors have generally been limited to executing stores in program order with respect to other stores. Generally, stores are presented in order to the memory system (e.g. to preserve memory consistency in multiprocessor configurations). Additionally, a processor must be able to determine the order of stores executed by that processor to allow for correct forwarding of store data to dependent loads. Another reason for the in-order execution limitation for stores is that the store queue is finite. A deadlock condition could result if the store queue is filled with speculatively executed stores and an older store is not yet executed. Since the speculatively executed stores cannot be committed (and removed from the store queue) until the older store is committed, and since the older store cannot be executed because the store queue is full, stores cannot be completed and a deadlock results. A method for executing stores out of order with respect to other stores which does not deadlock is therefore desired.

It is noted that loads, stores, and other instructions or instruction operations may be referred to herein as being older or younger than other instructions or instruction operations. A first instruction is older than a second instruction if the first instruction precedes the second instruction in program order (i.e. the order of the instructions in the program being executed). A first instruction is younger than a second instruction if the first instruction is subsequent to the second instruction in program order.

SUMMARY OF THE INVENTION

The problems outlined above are in large part solved by a processor as described herein. The processor includes a store queue and a store queue number assignment circuit. The store queue number assignment circuit assigns store queue numbers to stores, and operates upon instruction operations prior to the instruction operations reaching a point in the pipeline of the processor at which out of order instruction processing begins. Thus, store queue entries may be reserved for stores according to the program order of the stores. Stores may be executable out of order, since store queue entries are provided for the stores.

Additionally, in one embodiment, the store queue number identifying the youngest store represented in the store queue may be assigned to loads. In this manner, loads may determine which stores in the store queue are older or younger than the load based on relative position within the store queue. Checking for store queue hits may be qualified with the entries between the head of the store queue and the entry indicated by the load's store queue number. In one particular embodiment, the store queue number may include an additional "toggle" bit which is toggled each time the assignment of store queue numbers reaches the maximum store queue entry and wraps to zero. If the toggle bit of the store in the store queue entry identified by the load's store queue number differs from the toggle bit of the load's store queue number, than the store queue entry has been reassigned to a store younger than the load (subsequent to the retirement and commitment of the store previously occupying that store queue entry). Thus, the load is older than the stores in the store queue and store queue hits are not detected.

Broadly speaking, a processor is contemplated, comprising a store queue and a store queue number assignment circuit. The store queue includes a plurality of store queue entries, wherein each of the plurality of store queue entries is configured to store address and data information corresponding to a store memory operation. The store queue number assignment circuit is coupled to receive a first store memory operation and to assign a first store queue number indicative of a first one of the plurality of store queue entries to the first store memory operation. The store queue number assignment circuit operable at a first pipeline stage of a pipeline employed by the processor The first pipeline stage is prior to commencement of out of order instruction processing within the pipeline. Additionally, a computer system is contemplated including the processor and an input/output (I/O) device configured to communicate between the computer system and another computer system to which the I/O device is couplable.

Additionally, a method is contemplated. A store queue number is assigned to a store memory operation prior to the store memory operation reaching a pipeline stage at which out of order processing commences. The store memory operation is executed. Address and data information corresponding to the store memory operation is stored into a store queue entry of a store queue, the store queue entry identified by the store queue number.

BRIEF DESCRIPTION OF THE DRAWINGS

Other objects and advantages of the invention will become apparent upon reading the following detailed description and upon reference to the accompanying drawings in which.

Figure 1:
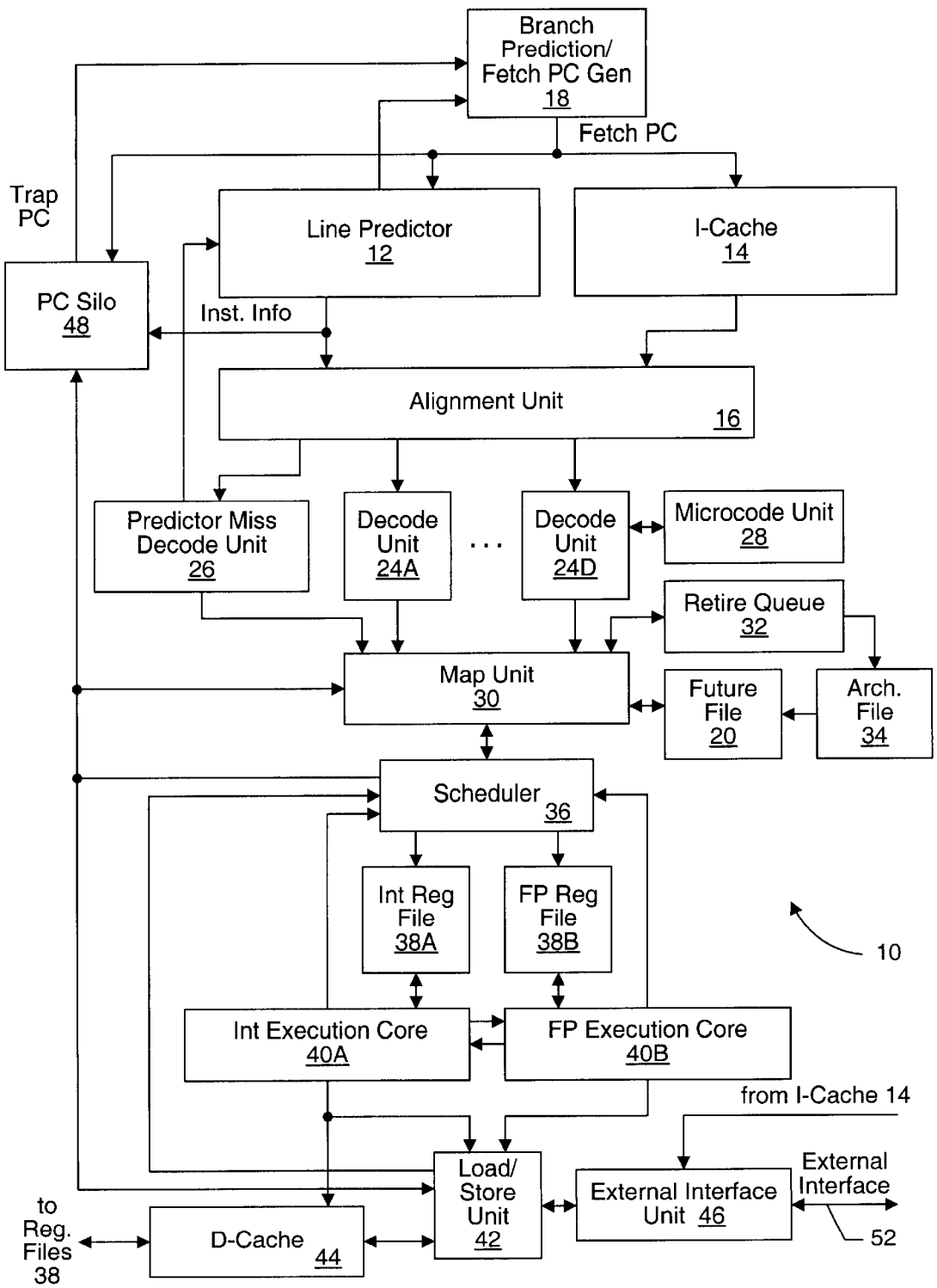
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Processor Overview

Turning now to FIG. 1, a block diagram of one embodiment of a processor 10 is shown. Other embodiments are possible and contemplated. In the embodiment of FIG. 1, processor 10 includes a line predictor 12, an instruction cache (I-cache) 14, an alignment unit 16, a branch prediction/fetch PC generation unit 18, a plurality of decode units 24A–24D, a predictor miss decode unit 26, a microcode unit 28, a map unit 30, a retire queue 32, an architectural renames file 34, a future file 20, a scheduler 36, an integer register file 38A, a floating point register file 38B, an integer execution core 40A, a floating point execution core 40B, a load/store unit 42, a data cache (D-cache) 44, an external interface unit 46, and a PC silo 48. Line predictor 12 is coupled to predictor miss decode unit 26, branch prediction/fetch PC generation unit 18, PC silo 48, and alignment unit 16. Line predictor 12 may also be coupled to I-cache 14. I-cache 14 is coupled to alignment unit 16 and branch prediction/fetch PC generation unit 18, which is further coupled to PC silo 48. Alignment unit 16 is further coupled to predictor miss decode unit 26 and decode units 24A–24D. Decode units 24A–24D are further coupled to map unit 30, and decode unit 24D is coupled to microcode unit 28. Map unit 30 is coupled to retire queue 32 (which is coupled to architectural renames file 34), future file 20, scheduler 36, and PC silo 48. Architectural renames file 34 is coupled to future file 20. Scheduler 36 is coupled to register files 38A–38B, which are further coupled to each other and respective execution cores 40A–40B. Execution cores 40A–40B are further coupled to load/store unit 42 and scheduler 36. Execution core 40A is further coupled to D-cache 44. Load/store unit 42 is coupled to scheduler 36, D-cache 44, and external interface unit 46. D-cache 44 is coupled to register files 38. External interface unit 46 is coupled to an external interface 52 and to I-cache 14. Elements referred to herein by a reference numeral followed by a letter will be collectively referred to by the reference numeral alone. For example, decode units 24A–24D will be collectively referred to as decode units 24.

In the embodiment of FIG. 1, processor 10 employs a variable byte length, complex instruction set computing (CISC) instruction set architecture. For example, processor 10 may employ the x86 instruction set architecture (also referred to as IA-32). Other embodiments may employ other instruction set architectures including fixed length instruction set architectures and reduced instruction set computing (RISC) instruction set architectures. Certain features shown in FIG. 1 may be omitted in such architectures.

Branch prediction/fetch PC generation unit 18 is configured to provide a fetch address (fetch PC) to I-cache 14, line predictor 12, and PC silo 48. Branch prediction/fetch PC generation unit 18 may include a suitable branch prediction mechanism used to aid in the generation of fetch addresses. In response to the fetch address, line predictor 12 provides alignment information corresponding to a plurality of instructions to alignment unit 16, and may provide a next fetch address for fetching instructions subsequent to the instructions identified by the provided instruction information. The next fetch address may be provided to branch prediction/fetch PC generation unit 18 or may be directly provided to I-cache 14, as desired. Branch prediction/fetch PC generation unit 18 may receive a trap address from PC silo 48 (if a trap is detected) and the trap address may comprise the fetch PC generated by branch prediction/fetch PC generation unit 18. Otherwise, the fetch PC may be generated using the branch prediction information and information from line predictor 12. Generally, line predictor 12 stores information corresponding to instructions previously speculatively fetched by processor 10. In one embodiments line predictor 12 includes 2K entries, each entry locating a group of one or more instructions referred to herein as a "line" of instructions. The line of instructions may be concurrently processed by the instruction processing pipeline of processor 10 through being placed into scheduler 36.

I-cache 14 is a high speed cache memory for storing instruction bytes. According to one embodiment I-cache 14 may comprise, for example, a 128 Kbyte, four way set associative organization employing 64 byte cache lines. However, any I-cache structure may be suitable (including direct-mapped structures).

Alignment unit 16 receives the instruction alignment information from line predictor 12 and instruction bytes corresponding to the fetch address from I-cache 14. Alignment unit 16 selects instruction bytes into each of decode units 24A–24D according to the provided instruction alignment information. More particularly, line predictor 12 provides an instruction pointer corresponding to each decode unit 24A–24D. The instruction pointer locates an instruction within the fetched instruction bytes for conveyance to the corresponding decode unit 24A–24D. In one embodiment, certain instructions may be conveyed to more than one decode unit 24A–24D. Accordingly, in the embodiment shown, a line of instructions from line predictor 12 may include up to 4 instructions, although other embodiments may include more or fewer decode units 24 to provide for more or fewer instructions within a line.

Decode units 24A–24B decode the instructions provided thereto, and each decode unit 24A–24D generates information identifying one or more instruction operations (or ROPs) corresponding to the instructions. In one embodiment, each decode unit 24A–24B may generate up to two instruction operations per instruction. As used herein, an instruction operation (or ROP) is an operation which an execution unit within execution cores 40A–40B is configured to execute as a single entity. Simple instructions may correspond to a single instruction operation, while more complex instructions may correspond to multiple instruction operations. Certain of the more complex instructions may be implemented within microcode unit 28 as microcode routines (fetched from a read-only memory therein via decode unit 24D in the present embodiment). Furthermore, other embodiments may employ a single instruction operation for each instruction (i.e. instruction and instruction operation may be synonymous in such embodiments).

PC silo 48 stores the fetch address and instruction information for each instruction fetch, and is responsible for redirecting instruction fetching upon exceptions (such as instruction traps defined by the instruction set architecture employed by processor 10, branch mispredictions, and other microarchitecturally defined traps). PC silo 48 may include a circular buffer for storing fetch address and instruction information corresponding to multiple lines of instructions which may be outstanding within processor 10. In response to retirement of a line of instructions, PC silo 48 may discard the corresponding entry. In response to an exception, PC silo 48 may provide a trap address to branch prediction/fetch PC generation unit 18. Retirement and exception information may be provided by scheduler 36. In one embodiment, PC silo 48 assigns a sequence number (R#) to each instruction to identify the order of instructions outstanding within processor 10. Scheduler 36 may return R#s to PC silo 48 to identify instruction operations experiencing exceptions or retiring instruction operations.

Upon detecting a miss in line predictor 12, alignment unit 16 routes the corresponding instruction bytes from I-cache 14 to predictor miss decode unit 26. Predictor miss decode unit 26 decodes the instruction, enforcing any limits on a line of instructions as processor 10 is designed for (e.g. maximum number of instruction operations, maximum number of instructions, terminate on branch instructions, etc.). Upon terminating a line, predictor miss decode unit 26 provides the information to line predictor 12 for storage. It is noted that predictor miss decode unit 26 may be configured to dispatch instructions as they are decoded. Alternatively, predictor miss decode unit 26 may decode the line of instruction information and provide it to line predictor 12 for storage. Subsequently, the missing fetch address may be reattempted in line predictor 12 and a hit may be detected.

In addition to decoding instructions upon a miss in line predictor 12, predictor miss decode unit 26 may be configured to decode instructions if the instruction information provided by line predictor 12 is invalid. In one embodiment, processor 10 does not attempt to keep information in line predictor 12 coherent with the instructions within I-cache 14 (e.g. when instructions are replaced or invalidate in I-cache 14, the corresponding instruction information may not actively be invalidated). Decode units 24A–24D may verify the instruction information provided, and may signal predictor miss decode unit 26 when invalid instruction information is detected. According to one particular embodiment, the following instruction operations are supported by processor 10: integer (including arithmetic, logic, shift/rotate, and branch operations), floating point (including multimedia operations), and load/store.

The decoded instruction operations and source and destination register numbers are provided to map unit 30. Map unit 30 is configured to perform register renaming by assigning physical register numbers (PR#s) to each destination register operand and source register operand of each instruction operation. The physical register numbers identify registers within register files 38A–38B. Map unit 30 additionally provides an indication of the dependencies for each instruction operation by providing R#s of the instruction operations which update each physical register number assigned to a source operand of the instruction operation. Map unit 30 updates future file 20 with the physical register numbers assigned to each destination register (and the R# of the corresponding instruction operation) based on the corresponding logical register number. Additionally, map unit 30 stores the logical register numbers of the destination registers, assigned physical register numbers, and the previously assigned physical register, numbers in retire queue 32. As instructions are retired (indicated to map unit 30 by scheduler 36), retire queue 32 updates architectural renames file 34 and frees any registers which are no longer in use. Accordingly, the physical register numbers in architectural register file 34 identify the physical registers storing the committed architectural state of processor 10, while future file 20 represents the speculative state of processor 10. In other words, architectural renames file 34 stores a physical register number corresponding to each logical register, representing the committed register state for each logical register. Future file 20 stores a physical register number corresponding to each logical register, representing the speculative register state for each logical register.

The line of instruction operations, source physical register numbers, and destination physical register numbers are stored into scheduler 36 according to the R#s assigned by PC silo 48. Furthermore, dependencies for a particular instruction operation may be noted as dependencies on other instruction operations which are stored in the scheduler. In one embodiment, instruction operations remain in scheduler 36 until retired.

Scheduler 36 stores each instruction operation until the dependencies noted for that instruction operation have been satisfied. In response to scheduling a particular instruction operation for execution, scheduler 36 may determine at which clock cycle that particular instruction operation will update register files 38A–38B. Different execution units within execution cores 40A–40B may employ different numbers of pipeline stages (and hence different latencies). Furthermore, certain instructions may experience more latency within a pipeline than others. Accordingly, a countdown is generated which measures the latency for the particular instruction operation (in numbers of clock cycles). Scheduler 36 awaits the specified number of clock cycles (until the update will occur prior to or coincident with the dependent instruction operations reading the register file), and then indicates that instruction operations dependent upon that particular instruction operation may be scheduled. It is noted that scheduler 36 may schedule an instruction once its dependencies have been satisfied (i.e. out of order with respect to its order within the schedulerqueue).

Integer and load/store instruction operations read source operands according to the source physical register numbers from register file 38A and are conveyed to execution core 40A for execution. Execution core 40A executes the instruction operation and updates the physical register assigned to the destination within register file 38A. Additionally, execution core 40A reports the R# of the instruction operation and exception information regarding the instruction operation (if any) to scheduler 36. Register file 38B and execution core 40B may operate in a similar fashion with respect to floating point instruction operations (and may provide store data for floating point stores to load/store unit 42).

In one embodiment, execution core 40A may include, for example, two integer units, a branch unit, and two address generation units (with corresponding translation lookaside buffers, or TLBs). Execution core 40B may include a floating point/multimedia multiplier, a floating point/ multimedia adder, and a store data unit for delivering store data to load/store unit 42. Other configurations of execution units are possible.

Load/store unit 42 provides an interface to D-cache 44 for performing memory operations and for scheduling fill operations for memory operations which miss D-cache 44. Load memory operations may be completed by execution core 40A performing an address generation and forwarding data to register files 38A–38B (from D-cache 44 or a store queue within load/store unit 42). Store addresses may be presented to D-cache 44 upon generation thereof by execution core 40A (directly via connections between execution core 40A and D-Cache 44). The store addresses are allocated a store queue entry. The store data may be provided concurrently, or may be provided subsequently, according to design choice. Upon retirement of the store instruction, the data is stored into D-cache 44 (although there may be some delay between retirement land update of D-cache 44). Additionally, load/ store unit 42 may include a load/store buffer for storing load/store addresses which miss D-cache 44 for subsequent cache fills (via external interface unit 46) and re-attempting the missing load/store operations. Load/store unit 42 is further configured to handle load/store memory dependencies.

D-cache 44 is a high speed cache memory for storing data accessed by processor 10. While D-cache 44 may comprise any suitable structure (including direct mapped and set associative structures), one embodiment of D-cache 44 may comprise a 128 Kbyte, 2 way set associative cache having 64 byte lines.

External interface unit 46 is configured to communicate to other devices via external interface 52. Any suitable external interface 52 may be used, including interfaces to L2 caches and an external bus or buses for connecting processor 10 to other devices. External interface unit 46 fetches fills for I-cache 16 and D-cache 44, as well as writing discarded updated cache lines from D-cache 44 to the external interface. Furthermore, external interface unit 46 may perform non-cacheable reads and writes generated by processor 10 as well.

Figure 2:
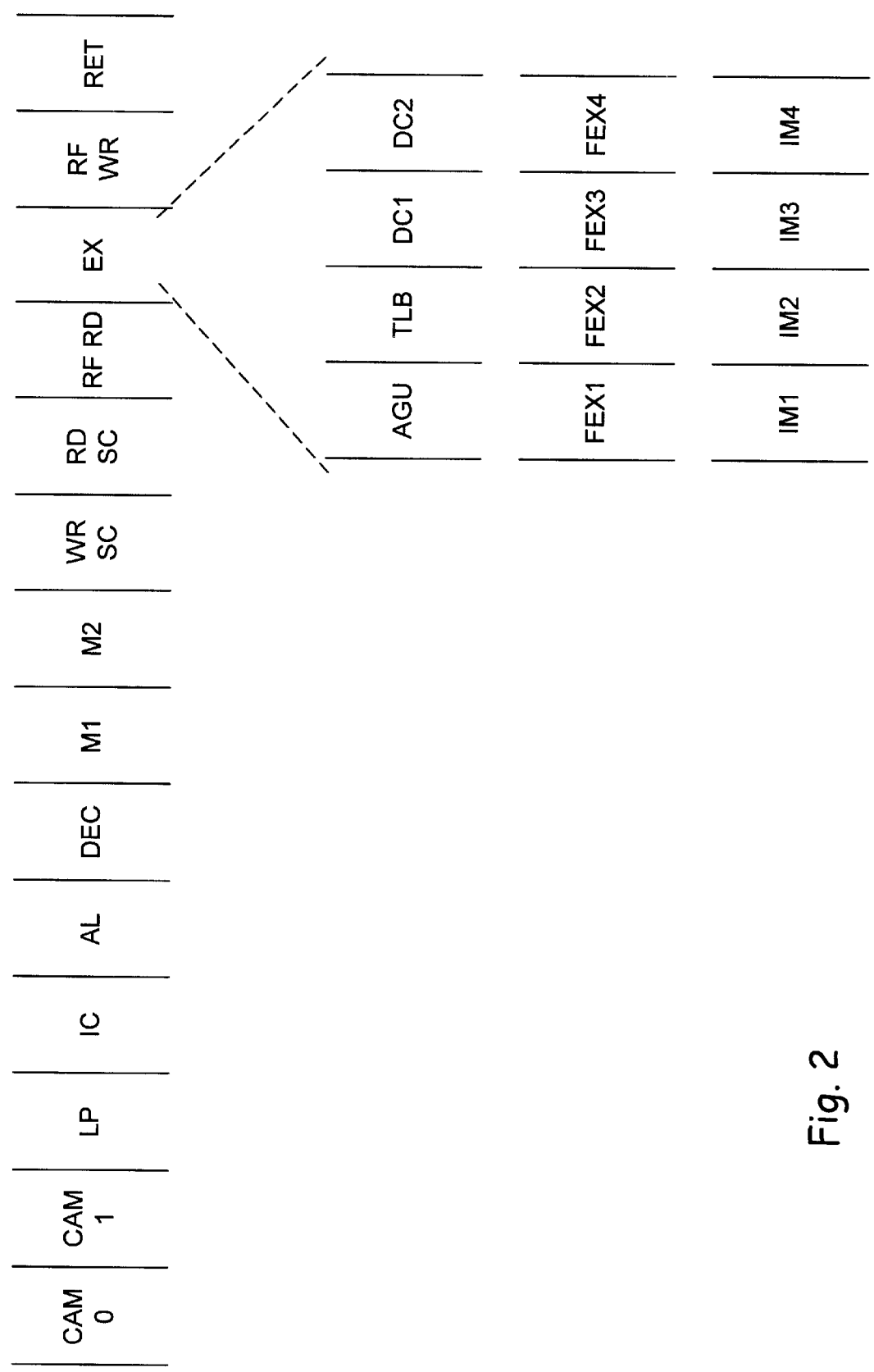
FIG. 2 is a pipeline diagram illustrating an exemplary pipeline which may be employed by one embodiment of the processor shown in FIG. 1.

Turning next to FIG. 2, an exemplary pipeline diagram illustrating an exemplary set of pipeline stages which may be employed by one embodiment of processor 10 is shown. Other embodiments may employ different pipelines, pipelines including more or fewer pipeline stages than the pipeline shown in FIG. 2. The stages shown in FIG. 2 are delimited by vertical dashed lines. Each stage is one clock cycle of a clock signal used to clock storage elements (e.g. registers, latches, flops, and the like) within processor 10.

As illustrated in FIG. 2, the exemplary pipeline includes a CAM0 stage, a CAM1 stage, a line predictor (LP) stage, an instruction cache (IC) stage, an alignment (AL) stage, a decode (DEC) stage, a map1 (M1) stage, a map2 (M2) stage, a write scheduler (WR SC) stage, a read scheduler (RD SC) stage, a register file read (RF RD) stage, an execute (EX) stage, a register file write (RF WR) stage, and a retire (RET) stage. Some instructions utilize multiple clock cycles in the execute state. For example, memory operations, floating point operations, and integer multiply operations are illustrated in exploded form in FIG. 2. Memory operations include an address generation (AGU) stage, a translation (TLB) stage, a data cache 1 (DC1) stage, and a data cache 2 (DC2) stage. Similarly, floating point operations include up to four floating point execute (FEX1–FEX4) stages, and integer multiplies include up to four (IM1–IM4) stages.

During the CAM0 and CAM1 stages, line predictor 12 compares the fetch address provided by branch prediction/ fetch PC generation unit 18 to the addresses of lines stored therein. Additionally, the fetch address is translated from a virtual address (e.g. a linear address in the x86 architecture) to a physical address during the CAM0 and CAM1 stages. In response to detecting a hit during the CAM0 and CAM1 stages, the corresponding line information is read from the line predictor during the line predictor stage. Also, I-cache 14 initiates a read (using the physical address) during the line predictor stage. The read completes during the instruction cache stage.

It is noted that, while the pipeline illustrated in FIG. 2 employs two clock cycles to detect a hit in line predictor 12 for a fetch address, other embodiments may employ a single clock cycle (and stage) to perform this operation. Moreover, in one embodiment, line predictor 12 provides a next fetch address for I-cache 14 and a next entry in line predictor 12 for a hit, and therefore the CAM0 and CAM1 stages may be skipped for fetches resulting from a previous hit in line predictor 12.

Instruction bytes provided by I-cache 14 are aligned to decode units 24A–24D by alignment unit 16 during the alignment stage in response to the corresponding line information from line predictor 12. Decode units 24A–24D decode the provided instructions, identifying ROPs corresponding to the instructions as well as operand information during the decode stage. Map unit 30 generates ROPs from the provided information during the map1 stage, and performs register renaming (updating future file 20). During the map2 stage, the ROPs and assigned renames are recorded in retire queue 32. Furthermore, the ROPs upon which each ROP is dependent are determined. Each ROP may be register dependent upon earlier ROPs as recorded in the future file, and may also exhibit other types of dependencies (e.g. dependencies on a previous serializing instruction, etc.)

The generated ROPs are written into scheduler 36 during the write scheduler stage. Up until this stage, the ROPs located by a particular line of information flow through the pipeline as a unit. However, subsequent to be written into scheduler 36, the ROPs may flow independently through the remaining stages, at different times Generally, a particular ROP remains at this stage until selected for execution by scheduler 36 (e.g. after the ROPs upon which the particular ROP is dependent have been selected for execution, as described above). Accordingly, a particular ROP may experience one or more clock cycles of delay between the write scheduler write stage and the read scheduler stage. During the read scheduler stage, the particular ROP participates in the selection logic within scheduler 36, is selected for execution, and is read from scheduler 36. The particular ROP then proceeds to read register file operations from one of register files 38A–38B (depending upon the type of ROP) in the register file read stage.

The particular ROP and operands are provided to the corresponding execution core 40A or 40B, and the instruction operation is performed on the operands during the execution stage. As mentioned above, some ROPs have several pipeline stages of execution. For example, memory instruction operations (e.g. loads and stores) are executed through an address generation stage (in which the data address, of the memory location accessed by the memory instruction operation is generated), a translation stage (in which the virtual data address provided by the address generation stage is translated) and a pair of data cache stages in which D-cache 44 is accessed. Floating point goperations may employ up to 4 clock cycles of execution, and integer multiplies may similarly employ up to 4 clock cycles of execution.

Upon completing the execution stage or stages, the particular ROP updates its assigned physical register during the register file write stage. Finally, the particular ROP is retired after each previous ROP is retired (in the, retire stage). Again, one or more clock cycles may elapse for a particular ROP between the register file write stage and the retire stage. Furthermore, a particular ROP may be stalled at any stage due to pipeline stall conditions, as is well known in the art.

Store Queue Number Assignment

Figure 3:
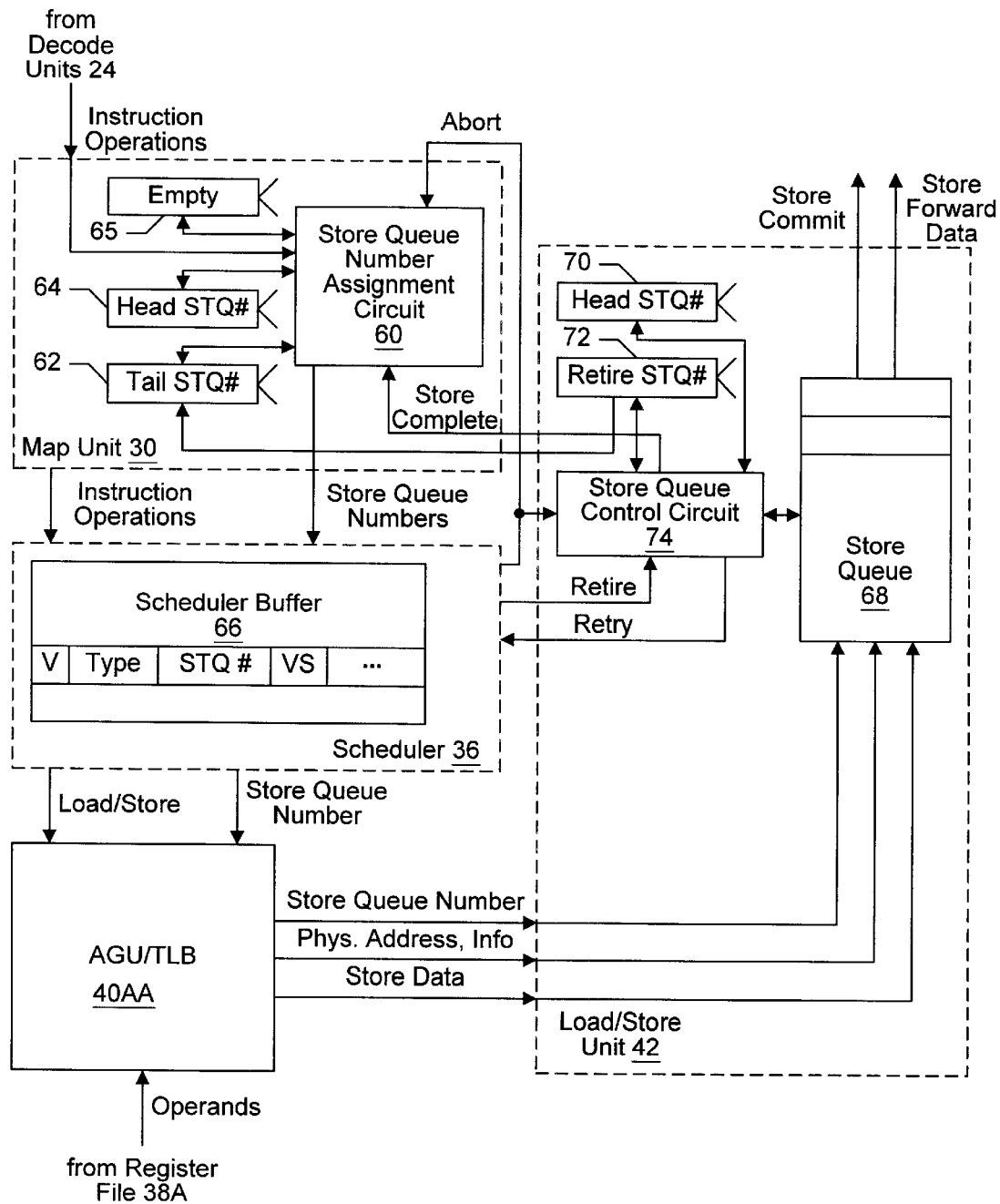
FIG. 3 is a block diagram illustrating a map unit, scheduler, AGU/TLB, and load/store unit shown in FIG. 1 in greater detail.

Turning now to FIG. 3, a block diagram illustrating one embodiment of map unit 30, scheduler 36, an address generation unit/translation lookaside buffer (AGU/TLB) 40AA, and load/store unit 42 in greater detail is shown. Other embodiments are possible and contemplated. In the embodiment of FIG. 3, map unit 30 includes a store queue number assignment circuit 60, a tail store queue number register 62, a head store queue number register 64, and an empty register 65. Scheduler 36 includes a scheduler buffer 66. Load/store unit 42 includes a store queue 68, a head store queue number register 70, a retire store queue number register 72, and a store queue control circuit 74. Map unit 30 is coupled to receive instruction operations from decode units 24 and an abort signal from scheduler 36, and to provide the instruction operations and store queue numbers to scheduler buffer 36. More particularly, store queue number assignment circuit 60 is coupled to receive the instruction operations and abort signal, and is coupled to tail store queue number register 62, head store queue number register 64, and empty register 65. Store queue number assignment circuit 60 is coupled to receive a store complete signal from store queue control circuit 74, and to provide the assigned store queue numbers to scheduler 36. Scheduler 36 is coupled to provide loads and stores to AGU/TLB 40AA, along with the corresponding store queue number. AGU/TLB 40AA is coupled to receive corresponding operands from register file 38A and to provide a physical address and other memory operation information to store queue 68, along with the store queue number and, in the case of a store, store data. Store queue control circuit 74 is coupled to receive a retire signal from scheduler 36 and to provide a retry signal to scheduler 36. Store queue 68 is coupled to provide a store to commit and store forward data to D-cache 44. Additionally, store queue control circuit 74 is coupled to store queue 68, retire store queue number register 72 and head store queue number register 70. Retire store queue number register 72 is coupled to tail store queue number register 62. In one embodiment, AGU/TLB 40AA is part of integer execution core 40A.

Generally, instruction operations are received by map unit 30 from decode units 24. Store queue number assignment circuit 60 scans the instruction operations for loads and stores. Stores are assigned store queue numbers (which identify a store queue entry assigned to the store) from the tail of the store queue (as indicated in tail store queue number register 62), and the tail store queue number is incremented. However, if the tail store queue number equals the head store queue number indicated by head store queue number register 64, store queue 68 is full and thus the store is stalled until older stores in store queue 68 are completed. Effectively, map unit 30 reserves store queue entries for stores as the stores are processed by map unit 30. Additionally, loads are assigned the current tail store queue number as well. The store queue number assigned to a load identifies the store queue entry storing the youngest store within store queue 68 which precedes the load in program order. During execution of the load, the load's store queue number (in combination with the head store queue number) identifies the store queue entries on which the load may hit. If the store queue is empty (as indicated by an empty indication stored in empty register 65) when a load is received by store queue number assignment circuit 60, store queue number assignment circuit 60 indicates that the store queue number assigned to the load is invalid (and thus the load does not hit any store queue entries).

Map unit 30 processes instruction operations prior to the point in the pipeline of processor 10 at which out of order instruction processing commences. In other words, instruction operations remain in program order up to and including processing by map unit 30. For example, map unit 30 may operate on instruction operations at the M1 and M2 pipeline stages illustrated in the pipeline of FIG. 2 for an embodiment of processor 10 employing the illustrated pipeline. Pipeline stages CAM0, CAM1, LP, IC, AL, DEC, M1, M2, and WR SC may be in-order processing stages (in which the instruction operations are maintained in program order), while the stages RD SC, RF RD, EX, and RF WR stages may be out of order processing stages (in which the instruction operations may be processed in any suitable order with respect to other instruction operations).

After being written into scheduler buffer 66, instruction processing may be performed out of order. Scheduler 36 may schedule instruction operations from scheduler buffer 66 for execution once dependencies for the instruction operations are satisfied, generally without regard to the program order of the scheduled instruction operations. Additionally, since store queue entries are reserved (via the assignment of store queue numbers which identify entries within store queue 68) prior to commencement of out of order instruction processing, store memory operations may be executed out of order with respect to other store memory operations. The address and data information corresponding to a store is stored into the assigned store queue entry, and other entries are assigned to earlier stores to store the corresponding information. Thus, deadlocks may be avoided. Furthermore, loads and stores may be executed out of order with respect to each other, since the loads include a store queue number identifying the store queue entry corresponding to the youngest store which is also older than the load. Thus, store queue entries corresponding to stores which are younger than the load may be precluded from being hit by the load.

Generally, store queue number assignment circuit 60 may be operable at any stage in the pipeline prior to commencement of out of order instruction processing. However, it may be desirable to assign store queue numbers from a pipeline stage as near as possible to the end of in-order instruction processing. If a store is encountered and the store queue is full, the store (and subsequent instruction operations) is stalled at the pipeline stage at which store queue numbers are assigned. If numerous pipeline stages are subsequent to the stage at which store queue numbers are assigned, performance may be impacted due to the stall early in the in-order stages. Viewed in another way, the earlier in the in-order processing that store queue numbers are assigned, the larger the number of store queue entries may be required to prevent large numbers of stalls due to store queue 68 being "full" (all entries reserved for stores which have not yet been committed).

Map unit 30 passes the instruction operations and assigned store queue numbers to scheduler 36, which writes the instruction operations into scheduler buffer 66. An exemplary memory operation entry is illustrated in scheduler buffer 66, including a valid bit and a type field (identifying the entry as storing a memory operation and which type of memory operation is stored, either load or store). For memory operations, the assigned store queue number is also stored. Still further, a store queue number valid bit is stored (VS in FIG. 3). The store queue number valid bit indicates invalid for loads for which the store queue number is invalidated by store queue number assignment circuit 60 (due to store queue 68 being empty). Additional information may be stored as well (e.g. size information, operand PR#s, etc.), and other types of entries (e.g. integer, floating point, etc.) may have different formats. Scheduler 36 schedules the memory operation for execution subsequent to each of its dependencies being satisfied, and conveys the load/store nature of the operation and the assigned store queue number to AGU/TLB 40AA.

AGU/TLB 40AA receives the memory operation and operands (read from register file 38A in response to PR#s from scheduler 36). AGU/TLB 40AA adds the operands to produce a virtual address, and translates the virtual address to a physical address using translations cached in the TLB. AGU/TLB 40AA provides the physical address and other information to store queue 68, as well as the store queue number. Store data is also provided, if the operation is a store. Among the information provided by AGU/TLB 40AA may be the load or store nature of the operation and whether or not the store queue number is valid, for loads. The physical address and other information is also provided by AGU/TLB 40AA to D-cache 44.

If the memory operation is a store, store queue 68 stores the information provided by AGU/TLB 40AA into the entry designated by the store queue number. On the other hand, if the memory operation is a load, store queue 68 compares the load information to the information in the store queue entries. If a hit on a store queue entry, is detected, the corresponding store queue data is read and provided to D-cache 44 for forwarding (store forward data in FIG. 3). Generally, store queue 68 comprises a plurality of store queue entries, each entry capable of storing address and data information corresponding to a store. Store queue 68 may include any suitable number of entries. For example, a suitable number of entries may, in one embodiment, be between 16 and 80 although more or fewer entries are possible. In one particular implementation, store queue 68 may comprise 48 store queue entries.

Additionally, store queue control circuit 74 may retry the load memory operation if more than one store queue entry is hit. Generally, a memory operation is referred to herein as "retired" if the operation's state within scheduler 36 is reset to a not executed state. Retrying the memory operation subsequently leads to the memory, operation being rescheduled and reexecuted. Since hitting more than one store queue entry may indicate that bytes accessed by the load are to be read from more than one entry, store queue control circuit 74 retries the load instead of attempting to provide the hardware for selecting bytes from multiple store queue entries for forwarding. In one particular embodiment, the store queue is divided into upper and lower halves. Different entries may be hit for the upper half and the lower half, but multiple hits in either half indicate a retry. A multimatch signal is generated by comparing the load information to the information in the store queue entries, and is used to generate the retry signal for the load. If a multimatch is not detected, D-cache 44 may merge the store forward data with cache data (to fill bytes not provided by the store) and may forward the merged data as the result of the load.

Store queue 68 retains the stores until they are retired by scheduler 36. Scheduler 36 signals store queue control circuit 74 via the retire signal to indicate retirement of one or more stores. In response to the retirement of stores, store queue control circuit 74 increments the retire store queue number in retire store queue number register 72. Thus, the retire store queue number identifies the youngest retired store in store queue 68. Stores in entries between the head store queue entry indicated by head store queue number register 70 and the entry indicated by the retire store queue number are eligible for commitment to D-cache 44 and/or memory. Store queue 68 conveys the retired stores, in order beginning with the oldest store as indicated by the head store queue number, using the store commit path to D-cache 44. After successfully committing a store, store queue control circuit 74 signals store queue number assignment circuit 60 that a store is complete. Store queue control circuit 74 increments the store queue number in head store queue number register 70 and, in response to the store complete signal, store queue number assignment circuit 60 increments the store queue number stored in head store queue number register 64. Thus, the store queue entries of completed stores become available for subsequent stores.

As used herein, an instruction operation is referred to as "retired" when that instruction operation is selected to commit its results to the architectural state of the processor. Prior to retirement, the results of the instruction operation can be discarded. A store is referred to as completed after the store has committed its store data (either to cache, to memory, or both). Completion of a store may be delayed from the retirement of that store by the latency of committing the data and by older stores which have not yet committed data.

If scheduler 36 detects various types of exception conditions for a particular instruction operation, scheduler 36 aborts the instruction operations in scheduler buffer 66 when that particular instruction operation is otherwise eligible for retirement. Accordingly, stores in store queue 68 which have not retired when the abort signal is asserted by scheduler 36 are invalidated. Additionally, store queue number assignment circuit 60 receives the abort signal and, in response, copies the store queue number in retire store queue number register 72 into tail store queue number register 62. In this manner, store queue number assignment circuit 60 recognizes the freeing of the store queue entries corresponding to the aborted stores.

It is noted that, since store queue numbers are assigned to loads as well, it is possible that a load will be delayed from scheduling until after the store queue entry identified by the load's store queue number has been reused for a different store, younger than the load. To detect this scenario, in one embodiment, store queue numbers include sufficient bits to enumerate each store queue entry along with an additional most significant bit which is toggled each time the maximum store queue number is reached and another increment occurs. Since a store queue entry cannot be reused twice prior to the retirement of a load having the store queue number, the additional most significant bit (a "toggle" bit) can be used to indicate whether or not the load's store queue number is still valid.

It is further noted that various combinations of AGUs and TLBs are possible. For example, in one embodiment, a load AGU and a separate store AGU are contemplated. The store AGU may be coupled to a write port on store queue 68, and the load AGU may be coupled to a compare port on store queue 68. Other embodiments may include any number of AGUs for loads, stores, or loads and stores, as desired.

It is noted that, while certain details of the various units shown in FIG. 3 are illustrated, other details and features unrelated to the detection of loads hitting in the store queue may have been omitted for simplicity. For example, map unit 30 may perform register renaming, as described above with respect to FIG. 1.

It is noted that, while registers are described for storing the head, tail, and retire store queue numbers and the empty indication, any clocked storage device may be equivalently used (e.g. latches, flops, etc.). Furthermore, the term "control circuit" is used above to refer to certain circuitry. Generally, a control circuit may include any combination of combinatorial logic (static, dynamic, etc.), clocked storage devices, state machines, and other custom circuitry which operate on inputs and produce outputs as described.

Figure 4:
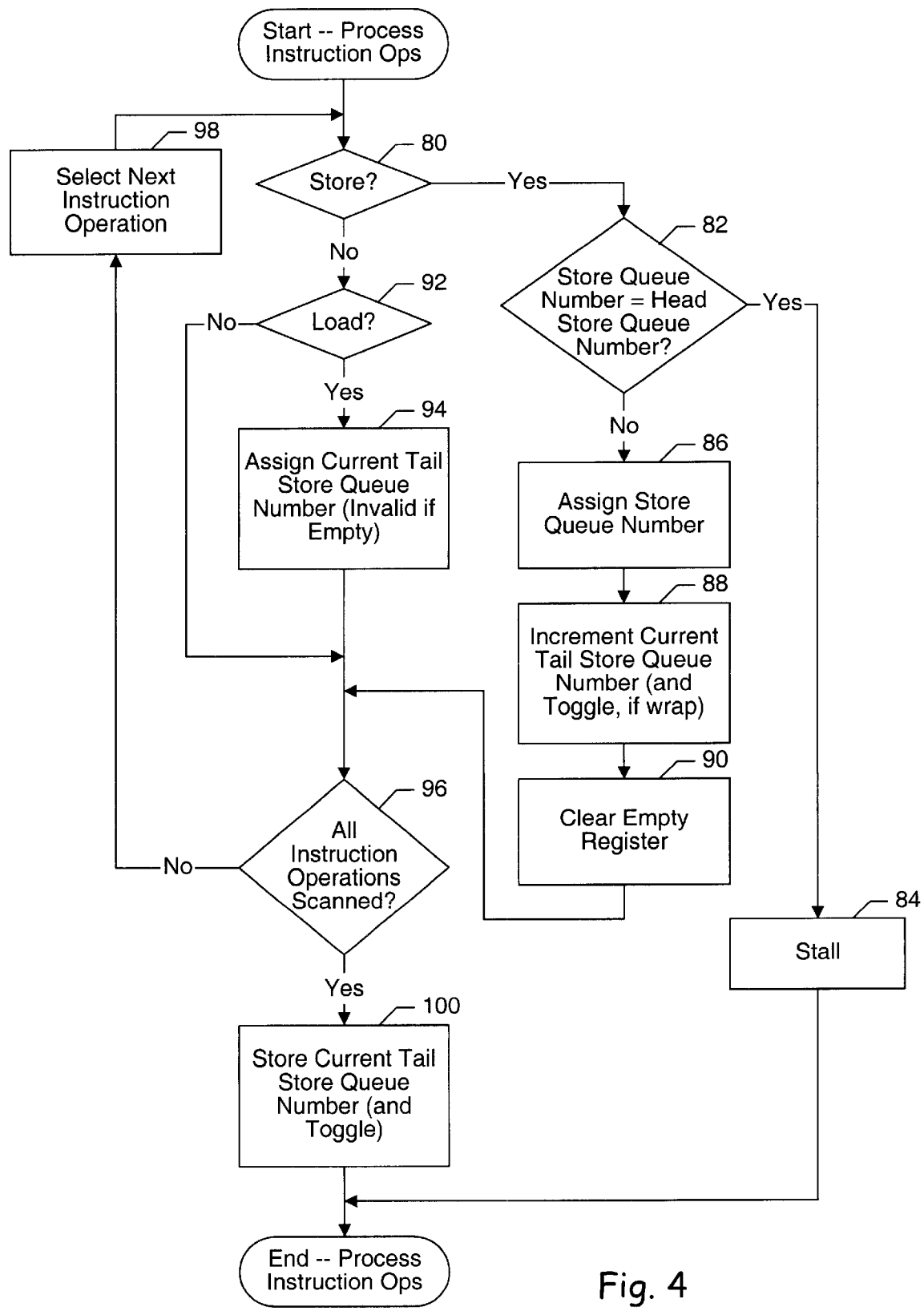
FIG. 4 is a flowchart illustration operation of one embodiment of a store queue number assignment circuit shown in FIG. 3 when processing instruction operations.

Turning next to FIG. 4, a flowchart is shown illustrating operation of one embodiment of store queue number assignment circuit 60 for processing of instruction operations received from decode units 24. Other embodiments are possible and contemplated. While the steps in FIG. 4 are illustrated in a particular order for ease of understanding, any suitable order may be used. Furthermore, steps may be performed in parallel using various circuitry within store queue number assignment circuit 60. Particularly, steps 80–94 are illustrated below as being repeated for each concurrently received instruction operation. However, store queue number assignment circuit 60 may perform these steps on each instruction operation in parallel, using separate circuitry, and may pass information (e.g. the current tail store queue number) between the circuits.

Store queue number assignment circuit 60 determines if the instruction operation being processed is a store (decision block 80). If the instruction operation is a store, store queue number assignment circuit 60 determines if the store queue number to be assigned to the store (the current tail store queue number plus one) is equal to the head store queue number (decision block 82). If the store queue number to be assigned equals the head store queue number (not including the toggle bit), then store queue 68 is currently full. Accordingly, store queue number 60 may stall the store instruction operation and subsequent instruction operations until a store completes and thus permits assignment of a store queue number to the store (step 84).

On the other hand, if the store queue number to be assigned is not equal to the head store queue number, then the store queue number is assigned to the store (step 86). Additionally, the current tail store queue number is incremented (step 88). If the current tail store queue number is the maximum store queue number value (and thus the increment wraps to zero), the toggle bit of the current store queue number is also inverted. Finally, if the empty indication in the empty register indicates that the store queue is empty, the empty indication is set to indicate not empty (step 90). For example, the empty indication may be a bit indicating empty when set and indicating not empty when clear.

If the instruction operation is not a store, store queue number assignment circuit 60 determines if the instruction operation is a load (decision block 92). If the instruction operation is a load, then the current tail store queue number is assigned to the load (step 94). If the empty indication indicates empty, then the assigned store queue number is invalid. For example, if the empty indication is a bit as mentioned above, the empty indication may be inverted and provided as a valid bit for the store queue number assigned to the load.

Store queue number circuit 60 may be configured to receive multiple instruction operations concurrently. Thus, if additional instruction operations are received, store queue number circuit 60 processes those instruction operations as well (decision block 96 and step 98). Once the concurrently received instruction operations have been processed, the current tail store queue number is stored into tail store queue number register 70 (step 100).

Figure 5:
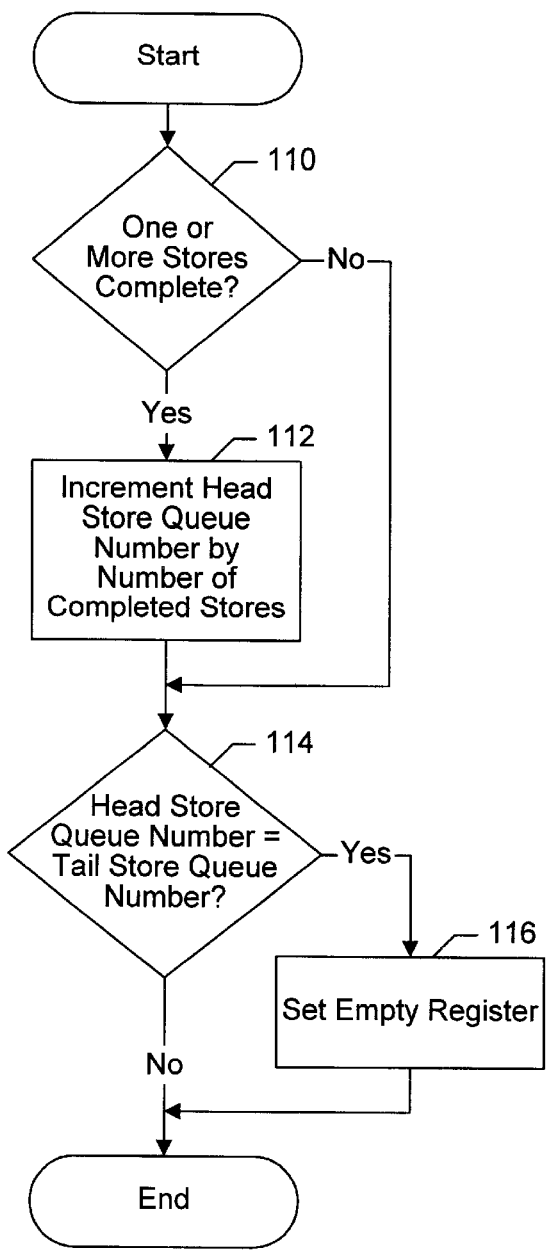
FIG. 5 is a flowchart illustrating operation of one embodiment of a store queue number assignment circuit shown in FIG. 3 when signalled that a store is complete.

Turning next to FIG. 5, a flowchart is shown illustrating operation of one embodiment of store queue number assignment circuit 60 in response to completion of one or more stores. Other embodiments are possible and contemplated. While the steps in FIG. 5 are illustrated in a particular order for ease of understanding, any suitable order may be used. Furthermore, steps may be performed in parallel using various circuitry within store queue number assignment circuit 60.

Store queue number assignment circuit 60 determines (from the store complete signal), whether or not one or more stores are completed by store queue control circuit 74 (decision block 110). If one or more stores are completed, store queue number assignment circuit 60 increments the head store queue number by the number of completed stores (e.g. increment by one if one store is completed, by two is two stores are completed, etc.) (step 112). In one embodiment, at most one store completes per clock cycle. In such an embodiment, step 112 increments by one if a store is indicated as completed.

Additionally, store queue number assignment circuit 60 determines if the head store queue number equals the tail store queue number (decision block 114). If so, the empty indication in empty register 65 is set to indicate empty (step 116).

Figure 6:
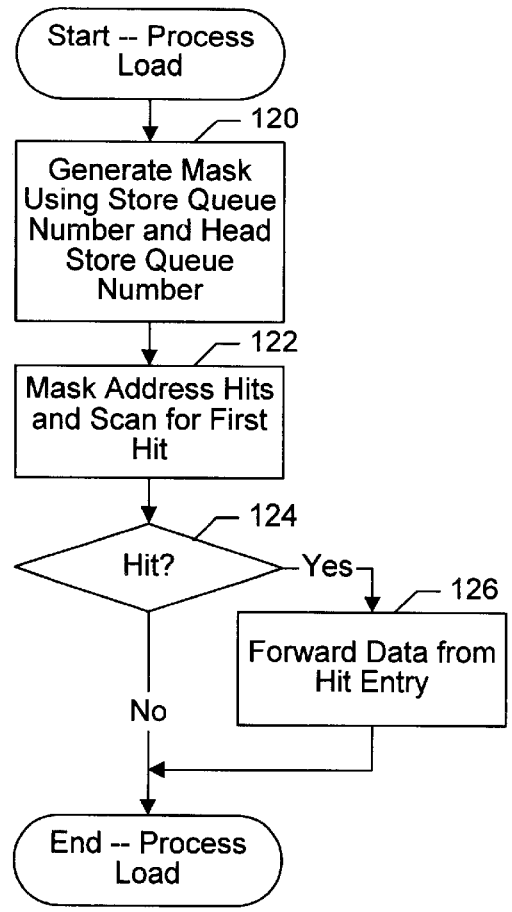
FIG. 6 is a flowchart illustration operation of one embodiment of a store queue control circuit illustrated in FIG. 3 when processing a load.

Turning now to FIG. 6, a flowchart illustrating operation of one embodiment of store queue control circuit 74 during the processing of a load is shown. Other embodiments are possible and contemplated. While the steps in FIG. 6 are illustrated in a particular order for ease of understanding, any suitable order may be used. Furthermore, steps may be performed in parallel using various circuitry within store queue control circuit 74. As mentioned above, store queue control circuit 74 processes stores by storing the address and data information in the entry identified by the store queue number assigned to the store.

Store queue control circuit 74 generates a mask using the load's store queue number and the head store queue number (step 120). The mask includes a bit for each store queue entry. The bit is set if the store queue entry is eligible to be hit by the load (i.e. the entry is between the head entry indicated by the head store queue number and the entry indicated by the load's store queue number), and is clear if the store queue entry is not eligible to be hit by the load.

Store queue 68 provides a hit signal for each store queue entry, indicating whether or not the load's address and size information hits the corresponding information in that entry. Store queue control circuit 74 masks the hits with the mask produced in step 120 (step 122). Store queue control circuit 74 then determines if a hit in the store queue is detected (decision block 124). In other words, store queue control circuit 74 determines if there is still a hit signal asserted after masking via step 122. If so, data is forwarded to D-cache 44 from the hit entry (step 126).

Figure 7:
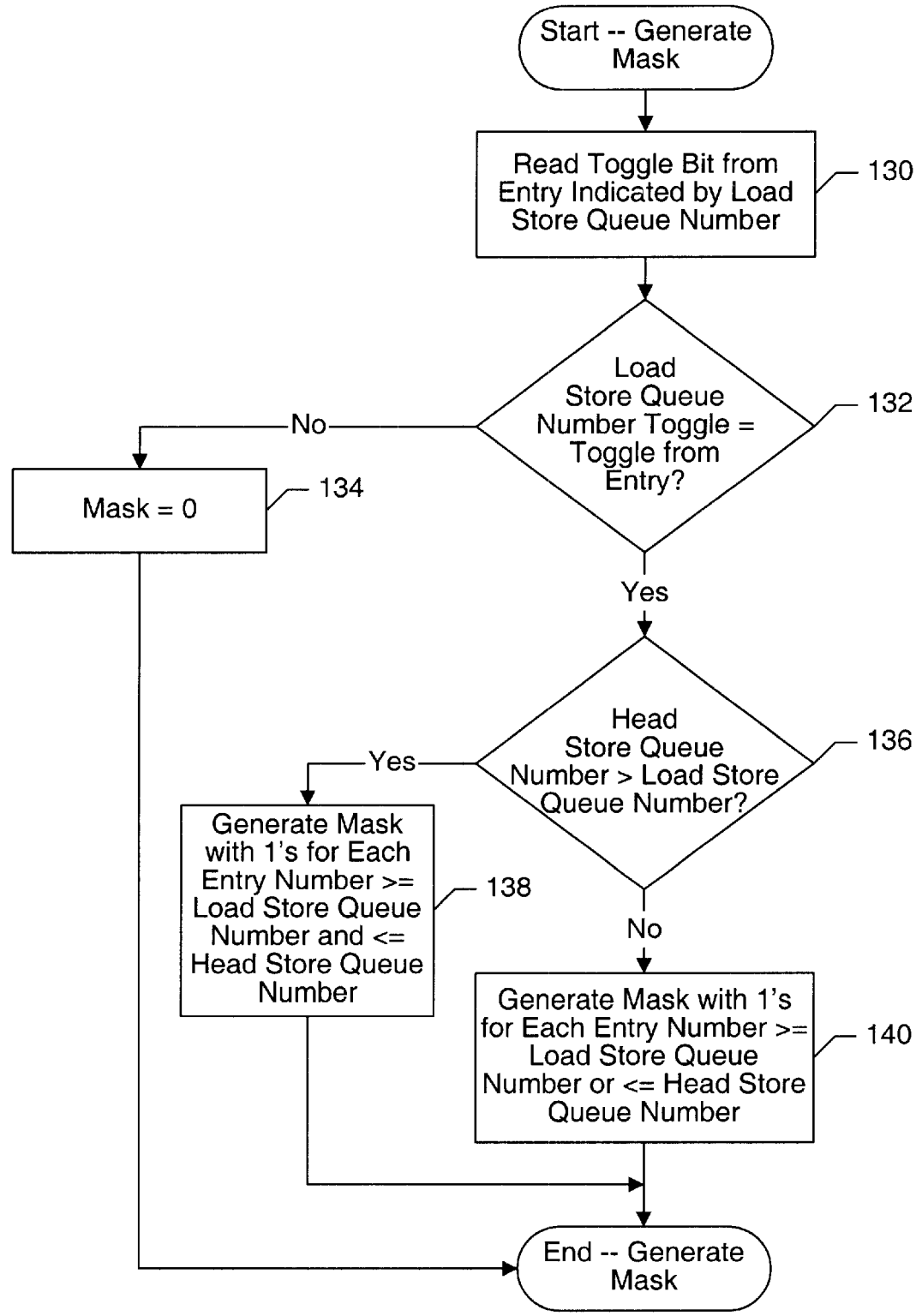
FIG. 7 is a flowchart illustrating one embodiment of a mask generation step shown in FIG. 6.

Turning now to FIG. 7, a flowchart illustrating one embodiment of the mask generation step 120 is shown. Other embodiments are possible and contemplated. While the steps in FIG. 7 are illustrated in a particular order for ease of understanding, any suitable order may be used. Furthermore, steps may be performed in parallel using various circuitry within store queue control circuit 74.

Store queue control circuit 74 reads the toggle bit from the store iqueue entry indicated by the store queue number (step 130). The toggle bit from the store which stores address and data information is stored by store queue 68 to detect, the case in which a store queue number assigned to a load has been reassigned (after commitment of the corresponding store) to a different store which is actually younger than the load. The toggle bit read from the entry is compared to the toggle bit of the load's store queue number (decision block 132). If the toggle bits differ, the store queue entry has been reassigned to a store younger than the load. Additionally, each store in the store queue is younger than the load. Accordingly, the load cannot hit any store entry and thus the mask is set to zero (step 134).

On the other hand, if the toggle bits are the same, then store queue control circuit compares the head store queue number and the load's store queue number (decision block 136). If the head store queue number is greater than the load store queue number, then the mask includes binary ones for each entry number greater than or equal to the load store queue number and less than or equal to the head store queue number, and binary zeros for other entries (step 138). If the head store queue number is less than the load store queue number, than the mask includes binary ones for each entry number greater than or equal to the load store queue number or each entry number less than or equal to the head store queue number, and binary zeros for other entries (step 140).

Figure 8:
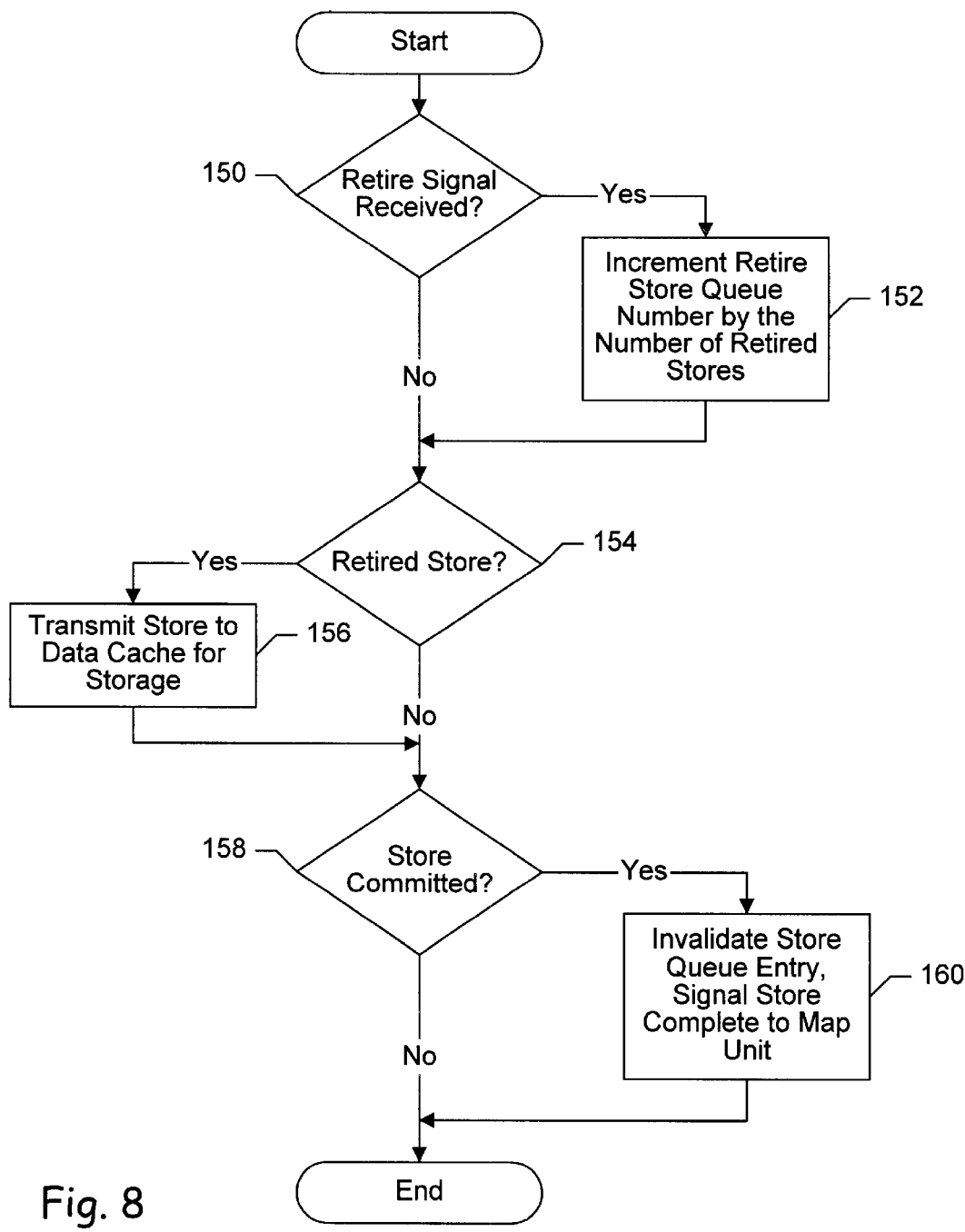
FIG. 8 is a flowchart illustrating operation of one embodiment of a store queue control circuit illustrated in FIG. 3 in response to various stages of store execution.

Turning next to FIG. 8, a flowchart illustrating operation of one embodiment of store queue control circuit 74 for various miscellaneous operations is shown. Other embodiments are possible and contemplated. While the steps in FIG. 8 are illustrated in a particular order for ease of understanding, any suitable order may be used. Furthermore, steps may be performed in parallel using various circuitry within store queue control circuit 74. Even more particularly, each of steps 150–152, 154–156, and 158–160 may be performed in parallel via separate circuitry within store queue control circuit 74.

Store queue control circuit 74 determines if an asserted retire signal is received (decision block 150). If so, store queue control circuit 74 increments the retire store queue number by the number of retiring stores (indicated by the retire signal) (step 152). Additionally, store queue control circuit 74 determines if there are any retired stores to be committed to D-cache 44 (or memory) (decision block 154). In other words, store queue control circuit 74 determines if there are any store queue entries between the head store queue number and the retire store queue number. If there are, store queue control circuit 74 selects a store queue entry and transmits the address and data information therein to D-cache 44 for storage (step 156). It is noted that store queue control circuit 74 may arbitrate for a port of D-cache 44 before transmitting the store address and data information. Still further, store queue control circuit 74 determines if a store has completed committing to D-cache 44 (or memory) (decision block 158). If so, store queue control circuit 74 invalidates the store queue entry and asserts the store complete signal to map unit 30 (more particularly, to store queue number assignment circuit 60) (step 160). Additionally, store queue control circuit 74 increments the head store queue number stored in head store queue number register 70.

Figure 9:
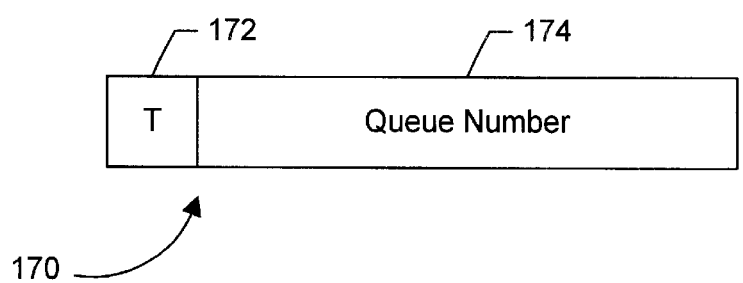
FIG. 9 is a block diagram illustrating one embodiment of a store queue number.

Turning now to FIG. 9, a block diagram illustrating an exemplary store queue number 170 is shown. In the embodiment shown, store queue number 170 includes a toggle bit 172 and a queue number 174. Queue number 174 identifies a store queue entry, and toggle bit 172 is used to identify reuse of the store queue entry for a different store.

Computer Systems

Figure 10:
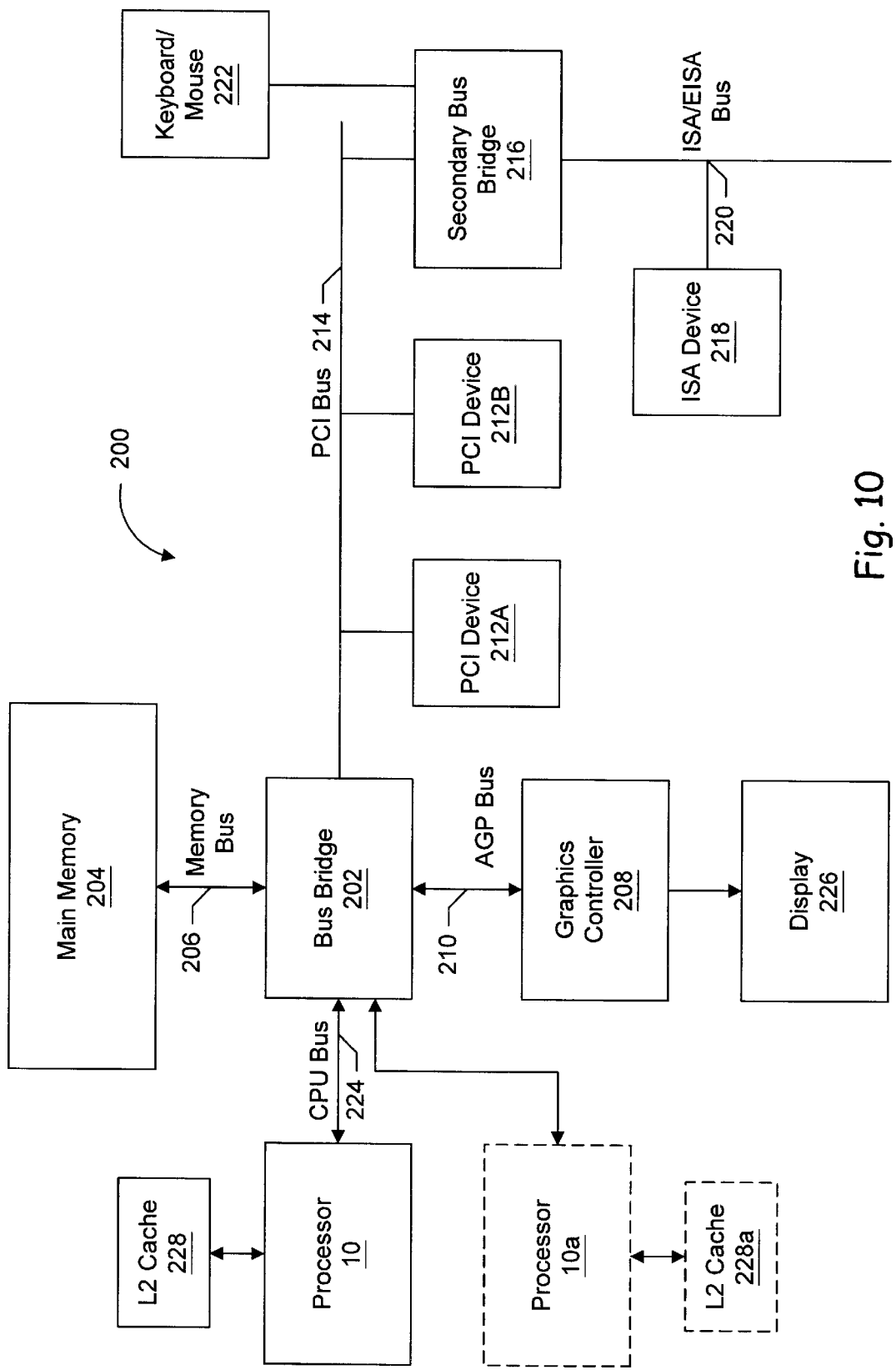
FIG. 10 is a block diagram of a first embodiment of a computer system including the processor shown in FIG. 1.

Turning now to FIG. 10, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise external interface 52.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used, by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 10) or may share CPU bus 224 with processor 10. Furthermore, processor 10a may be coupled to an optional L2 cache 228a similar to L2 cache 228.

Figure 11:
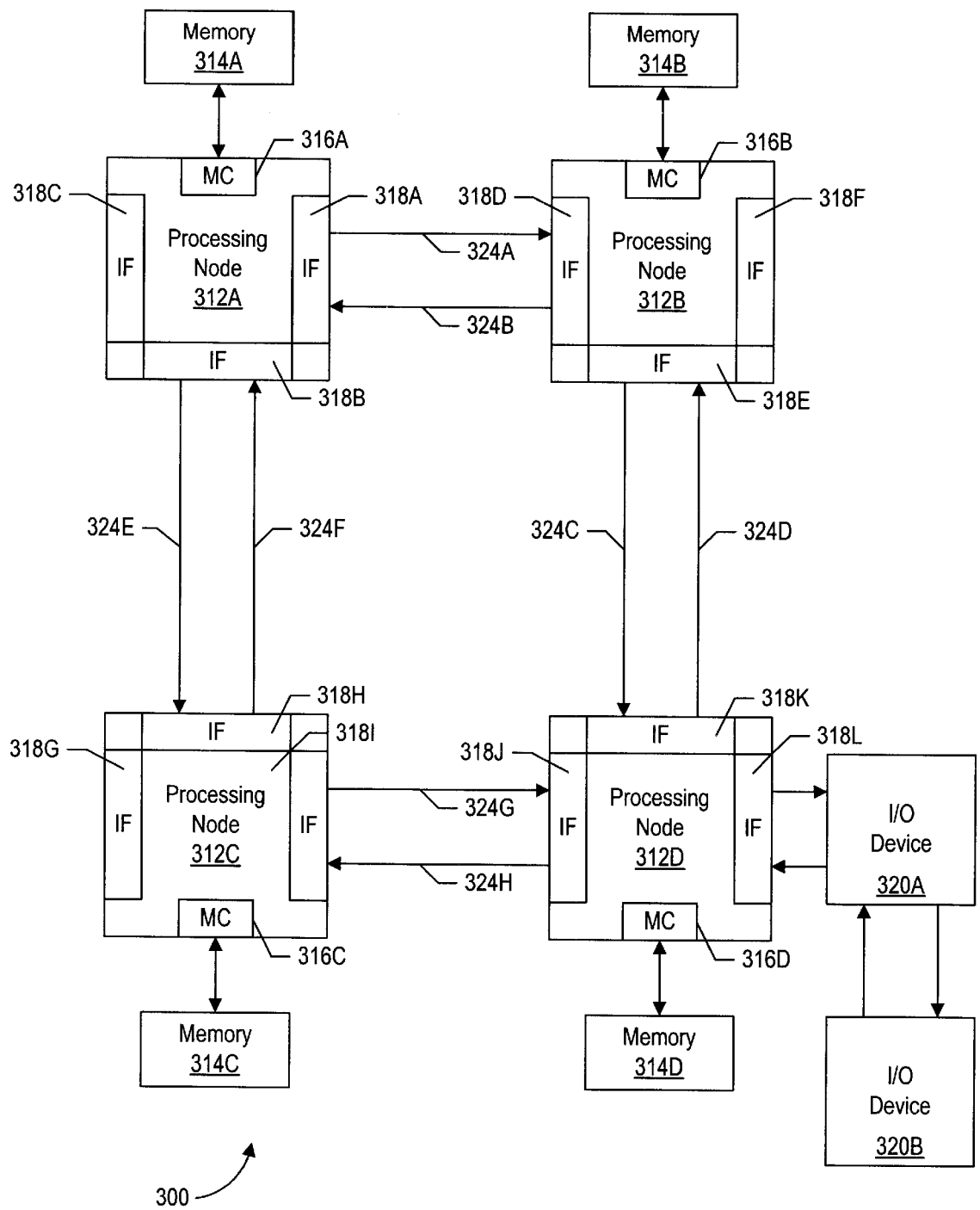
FIG. 11 is a block diagram of a second embodiment of a computer system including the processor shown in FIG. 1.

Turning now to FIG. 11, another embodiment of a computer system 300 is shown. Other embodiments are possible and contemplated. In the embodiment of FIG. 11, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L; Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 11. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a noncoherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 11. Any suitable routing algorithm may be used. Other embodiments of computer system 300 may include more or fewer processing nodes then the embodiment shown in FIG. 11.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, a processing node 312A–312D may comprise processor 10. External interface unit 46 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D, a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
   a store queue comprising a plurality of store queue entries, wherein each of said plurality of store queue entries is configured to store address and data information corresponding to a store memory operation; and
   a store queue number assignment circuit coupled to receive a first store memory operation, wherein said store queue number assignment circuit is configured to assign a first store queue number indicative of a first one of said plurality of store queue entries to said first store memory operation, said store queue number assignment circuit operable at a first pipeline stage of a pipeline employed by said processor, said first pipeline stage prior to commencement of out of order instruction processing within said pipeline.

2. The processor as recited in claim 1 wherein said store queue number assignment circuit is configured to maintain a tail store queue number indicative of a most recently assigned store queue number.

3. The processor as recited in claim 2 wherein said first store queue number is said tail store queue number incremented by one.

4. The processor as recited in claim 2 wherein said store queue number assignment circuit is coupled to receive a first load memory operation and is configured to assign said tail store queue number to said first load memory operation.

5. The processor as recited in claim 4 wherein said store queue assignment circuit is further configured to maintain an empty indication identifying whether or not said store queue is empty, and wherein, if said empty indication indicates that said store queue is empty, said store queue number assignment circuit is configured to invalidate said tail store queue number pointer assigned to said first load memory operation.

6. The processor as recited in claim 2 further comprising a retire store queue number register, wherein said retire store queue number register is configured to store a retire store queue number indicative of one of said plurality of store queue entries corresponding to a youngest retired store memory operation.

7. The processor as recited in claim 6 wherein said store queue number assignment circuit is coupled to receive an abort signal, and wherein said store queue number assignment circuit is configured to copy said retire store queue number to said tail store queue number responsive to an assertion of said abort signal.

8. The processor as recited in claim 6 further comprising a store queue control circuit coupled to said retire store queue number register and to said store queue, and wherein said store queue control circuit is further coupled to receive a retire signal indicative that a store memory operation is being retired, and wherein said store queue control circuit is configured to increment said retire store queue number stored in said retire store queue number register responsive to an assertion of said retire signal.

9. The processor as recited in claim 8 wherein said store queue control circuit is configured to select a store queue entry corresponding to an oldest retired store memory operation to commit data to a data cache, and wherein said store queue control circuit is configured to assert a store complete signal to said store queue number assignment circuit responsive to committing said data.

10. The processor as recited in claim 9 wherein said store queue number assignment circuit is coupled to receive said store complete signal, and wherein store queue number assignment circuit is configured to maintain a head store queue number indicative of said store queue entry corresponding to said oldest retired store memory operation, and wherein said store queue number assignment circuit is configured to increment said head store queue number responsive to an assertion of said store complete signal.

11. The processor as recited in claim 1 wherein said first store queue number comprises a queue number identifying said first one of said plurality of store queue entries and a toggle bit.

12. The processor as recited in claim 1 wherein said store queue number assignment circuit is coupled into a map unit.

13. The processor as recited in claim 12 wherein said map unit is further configured to perform register renaming.

14. The processor as recited in claim 12 further comprising a scheduler configured to schedule instruction operations for execution, wherein said scheduler is coupled to said map unit, and wherein said scheduler is coupled to receive said first store memory operation and said first store queue number from said store queue number assignment circuit.

15. A computer system comprising:
   a processor including:
      a store queue comprising a plurality of store queue entries, wherein each of said plurality of store queue entries is configured to store address and data information corresponding to a store memory operation; and
      a store queue number assignment circuit coupled to receive a first store memory operation, wherein said store queue number assignment circuit is configured to assign a first store queue number indicative of a first one of said plurality of store queue entries to said first store memory operation, said store queue number assignment circuit operable at a first pipeline stage of a pipeline employed by said processor, said first pipeline stage prior to commencement of out of order instruction processing within said pipeline; and
   an input/output (I/O) device configured to communicate between said computer system and another computer system to which said I/O device is couplable.

16. The computer system as recited in claim 15 wherein said I/O device is a modem.

17. The computer system as recited in claim 15 further comprising a second processor identical to said processor.

18. The computer system as recited in claim 15 further comprising an audio I/O device.

19. The computer system as recited in claim 18 wherein said audio I/O device comprises a sound card.

20. The computer system as recited in claim 15 further comprising a second processor comprising:

- a second store queue comprising a second plurality of store queue entries, wherein each of said second plurality of store queue entries is configured to store address and data information corresponding to a store memory operation; and
- a second store queue number assignment circuit coupled to receive a second store memory operation, wherein said second store queue number assignment circuit is configured to assign a second store queue number indicative of a first one of said second plurality of store queue entries to said second store memory operation, said second store queue number assignment circuit operable at a first pipeline stage of a pipeline employed by said second processor, said first pipeline stage prior to commencement of out of order instruction processing within said pipeline.

21. A method comprising:

assigning a store queue number to a store memory operation in a first pipeline stage of a pipeline, the first pipeline stage prior to a second pipeline stage of said pipeline, said second pipeline stage being a stage at which out of order processing commences in said pipeline, wherein said store, queue number is indicative of one of a plurality of store queue entries forming a store queue;

executing said store memory operation; and storing address and data information corresponding to said store memory operation into a store queue entry of said store queue, said store queue entry being said one of said plurality of store queue entries identified by said store queue number.

22. The method as recited in claim 20 further comprising assigning a store queue number to a load memory operation prior to said load memory operation reaching a pipeline stage at which out of order processing commences, said store queue number assigned to said load memory operation identifying a store queue entry corresponding to a youngest store in said store queue which is older than said load memory operation.

23. The method as recited in claim 22 further comprising invalidating said store queue number assigned to said load memory operation if said store queue is empty during said assigning said store queue number to said load memory operation.

24. The method as recited in claim 23 further comprising:

- determining if each store queue entry within said store queue is assigned; and
- stalling said store memory operation at said assigning if each store queue entry is assigned.

* * * * *